United States Patent
Wei et al.

(10) Patent No.: US 9,218,043 B2
(45) Date of Patent: Dec. 22, 2015

(54) BATTERY CHARGE SYSTEM AND METHOD CAPABLE OF OPERATING IN DIFFERENT CONFIGURATIONS

(71) Applicant: Intersil Americas LLC, Milpitas, CA (US)

(72) Inventors: Jia Wei, Cary, NC (US); Majid Kafi, Fremont, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 410 days.

(21) Appl. No.: 13/850,977

(22) Filed: Mar. 26, 2013

(65) Prior Publication Data

US 2014/0032953 A1 Jan. 30, 2014

Related U.S. Application Data

(60) Provisional application No. 61/675,888, filed on Jul. 26, 2012.

(51) Int. Cl.
- *H02J 7/00* (2006.01)
- *G06F 1/32* (2006.01)
- *H02M 3/155* (2006.01)
- *H02J 7/02* (2006.01)

(52) U.S. Cl.
CPC .............. *G06F 1/3234* (2013.01); *H02J 7/0068* (2013.01); *H02J 7/022* (2013.01); *H02M 3/155* (2013.01)

(58) Field of Classification Search
CPC ....................................................... H02J 7/0068
USPC .......................................................... 320/110
See application file for complete search history.

(56) References Cited

U.S. PATENT DOCUMENTS

| | | | |
|---|---|---|---|
| 2005/0242772 A1* | 11/2005 | Cha ................................ | 320/115 |
| 2005/0280392 A1* | 12/2005 | Nguyen ......................... | 320/101 |
| 2006/0103344 A1* | 5/2006 | Hassan et al. .................. | 320/103 |
| 2006/0181244 A1* | 8/2006 | Luo et al. ....................... | 320/128 |
| 2008/0116854 A1* | 5/2008 | Park ............................... | 320/160 |
| 2008/0191555 A1* | 8/2008 | Cha ................................ | 307/43 |
| 2009/0027013 A1* | 1/2009 | Odaohhara .................... | 320/160 |

(Continued)

OTHER PUBLICATIONS

"2-4 Cell LI+ Battery SMBus Charge Controller with N-Channel Power MOSFET Selector and Advanced Circuit Protection." Texas Instruments bq24725 SLUS702A—Jul. 2010—Revised Nov. 2010 pp. 1-40.

(Continued)

*Primary Examiner* — Suchin Parihar
(74) *Attorney, Agent, or Firm* — Gary Stanford

(57) ABSTRACT

A controller configurable to operate in either in an NVDC mode or a standard mode. The controller includes mode logic that detects a mode value indicative of the selected mode and that asserts a corresponding mode signal, and control logic that is configured to operate according to the selected battery charging mode based on the mode signal and that provides a control signal accordingly. In the standard mode, the control signal is in either an on or off state depending upon presence of an external adapter and the charge state of the battery. In the NVDC mode, the control signal may operate in a linear mode if the battery is deeply discharged. A battery detector provides a battery indication that is used to switch the regulation operating point of an external system voltage. A power monitor output provides an indication of power being provided via the system voltage.

20 Claims, 5 Drawing Sheets

(56) References Cited

U.S. PATENT DOCUMENTS

| | | | |
|---|---|---|---|
| 2009/0140698 A1* | 6/2009 | Eberhard et al. | 320/152 |
| 2010/0289457 A1* | 11/2010 | Onnerud et al. | 320/162 |
| 2011/0227531 A1* | 9/2011 | Rajakaruna | 320/109 |
| 2013/0082643 A1* | 4/2013 | Cha | 320/107 |
| 2013/0086409 A1* | 4/2013 | Lu et al. | 713/340 |
| 2014/0035530 A1* | 2/2014 | Shao | 320/109 |
| 2014/0084862 A1* | 3/2014 | Kawaguchi et al. | 320/108 |
| 2014/0111139 A1* | 4/2014 | Chen et al. | 320/107 |
| 2014/0167694 A1* | 6/2014 | Gjinali et al. | 320/109 |
| 2014/0222271 A1* | 8/2014 | Merten et al. | 701/22 |
| 2014/0327306 A1* | 11/2014 | Inoue | 307/23 |
| 2015/0069970 A1* | 3/2015 | Sarkar et al. | 320/109 |
| 2015/0134980 A1* | 5/2015 | Chen et al. | 713/300 |

OTHER PUBLICATIONS

"1-4 Cell LI+ Battery SMBus Charge Controller for Supporting Turbo Boost Mode with N-Channel Power MOSFET Selector." Texas Instruments bq24735 SLUSAK9A—Sep. 2011—Revised Jan. 2013 pp. 1-42.

"Narrow VDC Regulator/Charger with SMBus Interface." Intersil™ ISL9519 FN6773.3 Mar. 1, 2012 pp. 1-32.

* cited by examiner

BATTERY CHARGE SYSTEM AND METHOD CAPABLE OF OPERATING IN DIFFERENT CONFIGURATIONS

CROSS-REFERENCE TO RELATED APPLICATIONS

This application claims the benefit of U.S. Provisional Application Ser. No. 61/675,888, filed on Jul. 26, 2012, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

Figure 1:
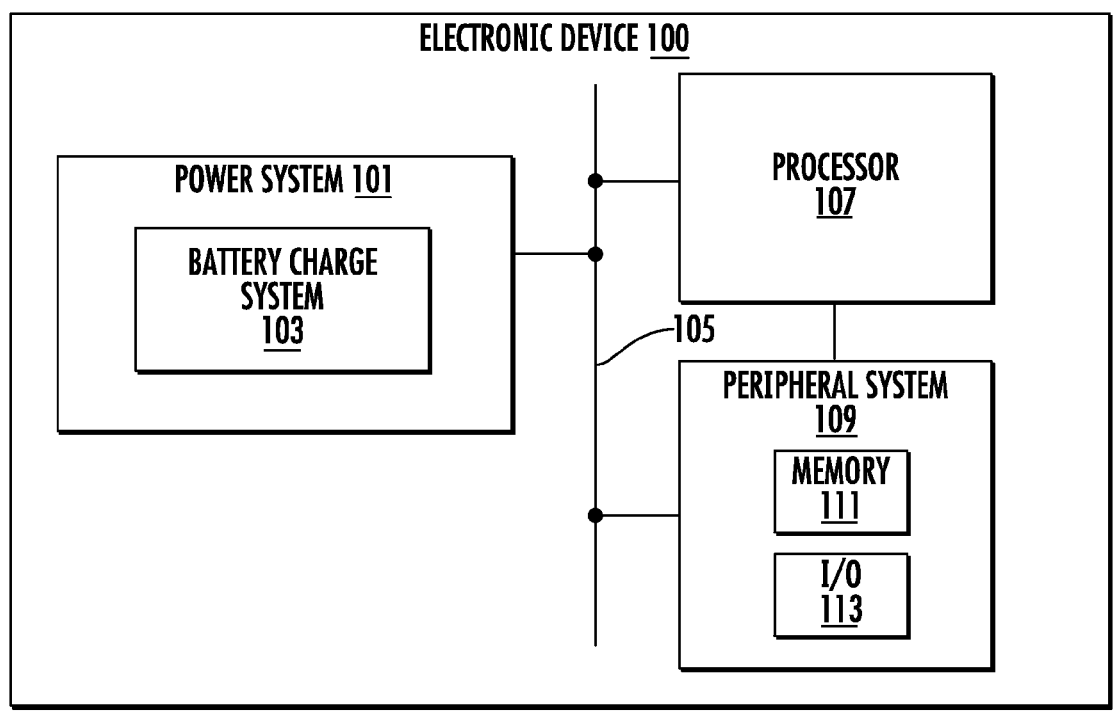
FIG. 1 is a simplified block diagram of an electronic device configured with a power system including a battery charge system implemented according to an embodiment of the present invention.

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

There are several types of battery charger architectures for electronic devices, including a standard charger and a narrow voltage direct current (NVDC) charger. The two types of chargers work differently. Products are available in each market segment, but it has been necessary to change the conventional solution when the system power delivery architecture was changed. Further, sudden removal of battery caused the system crash due to insufficient power. The conventional communication provided by a system management bus (SM-bus) indicating that the battery has been removed was usually too slow to be useful to prevent system crash. Also, conventional chargers only provided an adapter current monitor or a battery current monitor. The motherboard power consumption rate, however, is much more meaningful and useful than individual current information.

A battery charge system capable of operating in different configurations according to an embodiment of the present invention provides a charger that is capable of operating in a selected one of a standard charger mode and an NVDC charger mode. In a conventional configuration, a battery switch circuit operated in a dedicated mode depending upon the particular configuration. For the multiple mode battery charge system as described herein, a single battery switch circuit is configured to operate in either one of two different modes based on the configuration the charge system. The configuration may be set by hardware or even set by software on the fly to provide maximum flexibility and benefit to the user and the system. Such a product enables customers to use a single solution that operates in either power delivery architecture. This provides significant value by saving engineering time as well as improving inventory management benefit.

When the load is heavy, the adapter and the battery may operate together to provide power to the system. Sudden removal of battery, however, may make the system crash due to insufficient power. As described herein, a battery sensor 219 (FIG. 2) provides a BATOK signal indicating whether a battery is present. There are two voltage references including a "VSYS_MAX" and "VSYS_MIN" for the output voltage regulation reference. When the battery is installed and the charger is in output voltage regulation mode, the VSYS_MAX voltage reference is used. When the battery is removed, the charger is switched to operate in buck mode for regulating the output voltage, and the output voltage regulation reference is switched to VSYS_MIN to prevent overshoot of the adapter current.

The battery charge system provides a power monitor (PMON) of the overall system power provided to an external load. PMON is calculated differently depending upon wither the battery is being charged or discharged. When the battery is discharging and thus supplying power, PMON is equal to or otherwise indicates the alternating current (AC) adapter power (adapter voltage multiplied by the adapter current) plus the battery discharge power (battery voltage multiplied by the discharge current). When the battery is charging, PMON is equal to or otherwise indicates the adapter power (adapter voltage multiplied by the adapter current) minus battery charge power (battery voltage multiplied by the charge current), so that the difference is provided to the external load.

FIG. 1 is a simplified block diagram of an electronic device 100 configured with a power system 101 including a battery charge system 103 implemented according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a bus 105, which includes any combination of power and/or signal conductors. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The battery charge system 103 is configured to include a rechargeable battery and may be configured to operate with an alternating current (AC) adapter or the like.

Figure 2:
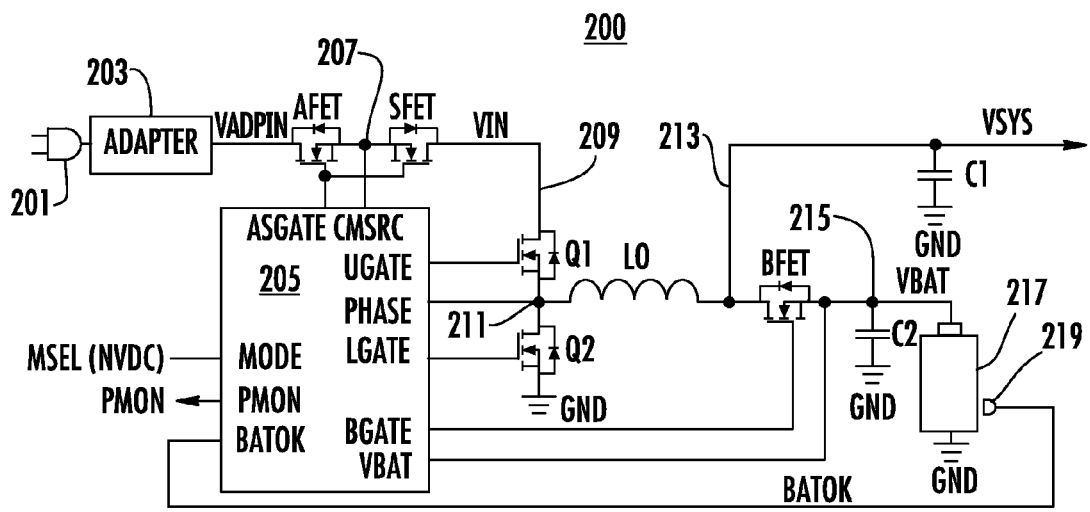
FIG. 2 is a simplified schematic diagram of a battery charge system configured as an NVDC charger which may be used as the battery charge system of FIG. 1.

FIG. 2 is a simplified schematic diagram of a battery charge system 200 configured as an NVDC charger which may be used as the battery charge system 103. An AC source 201 (represented as an AC plug) provides an AC voltage to an AC to DC (AC/DC) adapter 203, which converts the AC voltage to an input DC adapter voltage VADPIN. VADPIN is provided to the drain of an N-channel field-effect transistor (NFET) AFET, which has its gate coupled to a gate drive output ASGATE of a controller 205 and its source coupled to a common source node 207. Node 207 is further coupled to the source of another NFET SFET and to a common source node CMSRC input of the controller 205. The gate of SFET is coupled to the ASGATE output of the controller 205 and its drain is coupled to a node 209 developing an input voltage VIN. AFET and SFET are coupled in a back-to-back configuration in which AFET isolates the AC/DC adapter 203 from the remaining battery charge circuitry and SFET blocks battery current from flowing to the AC/DC adapter 203 when both are turned off by the controller 205.

VIN is provided to the drain of an NFET Q1, having its source coupled to a phase node 211 and its gate coupled to an upper gate drive output UGATE of the controller 205. The phase node 211 is coupled to a PHASE terminal of the controller 205 and to the drain of another NFET Q2. Q2 has its gate coupled to a lower gate drive output LGATE of the controller 205 and has its source coupled to a common reference node, such as ground (GND). The phase node 211 is further coupled to one end of an output inductor LO, which has its other end coupled to a system node 213 developing a system voltage VSYS. VSYS may be provided directly to other system components via bus 105 in one configuration, or to additional systems of the power system 101, such as a voltage regulator (not shown), which converts VSYS to a regulated voltage provided on the bus 105 to provide power to system devices of the electronic device 100 (e.g., the processor 107 and/or the peripheral system 109). A capacitor C1 is coupled between the system node 213 and GND for filtering VSYS.

System node 213 is further coupled to the drain of another NFET BFET, having its source coupled to a battery node 215 developing a battery voltage VBAT. A rechargeable battery 217 is coupled between the battery node 215 and GND. A capacitor C2 is coupled between the battery node 215 and GND for filtering VBAT. A gate drive terminal BGATE of the controller 205 is provided to the gate of BFET. BFET is a battery switch that is operated by the controller 205 depending upon the operating configuration and the state of the battery 217 as further described herein. The battery node 215 is further coupled to a battery terminal VBAT of the controller 205 for monitoring the battery voltage. The battery sensor 219 is provided to detect the physical presence of the battery 217, and provides a battery present signal BATOK to a BATOK terminal of the controller 205.

The transistors AFET, SFET, BFET, Q1 and Q2 are each shown as a metal-oxide semiconductor, field-effect transistor (MOSFET), although alternative power switching devices or electronic switches are contemplated, such as similar forms (e.g., FETs, MOS devices, etc.), bipolar junction transistors (BJTs) and the like, insulated-gate bipolar transistors (IGBTs) and the like, etc. Each transistor device is sized and configured to perform the intended function.

In this case, the battery charge system 200 is configured as an NVDC charger for the NVDC mode. The controller 205 includes a MODE terminal coupled to a mode select (MSEL) signal or value indicative of the NVDC operating mode. Various methods may be used to configure the MODE terminal and the MSEL signal for indicating the configuration mode of operation. In one embodiment, for example, MSEL is a voltage having a level indicating one of the various configurations. If the number of configuration modes is only two, such as a standard mode and an NVDC mode as in one embodiment, then the voltage levels may include supply voltage levels such as GND and VDD or the like. Alternative voltage levels are contemplated. Also, additional voltage levels are contemplated for embodiments with additional operating configurations (e.g., more than 2).

In other embodiments as further described herein, an external component, such as a resistor or the like, is coupled to the MODE terminal to indicate the operative configuration. Internal circuitry of the controller 205 determines the resistance of an externally coupled resistor for determining the configuration and corresponding operating mode, such as between the standard mode and the NVDC mode.

The controller 205 also has a power monitor (PMON) terminal which outputs a voltage signal PMON indicative of a system power level. The battery 217 is configured to receive charge current when charging, sensed as a signal ICHG, and to provide a discharge current when discharging, sensed as a signal IDIS, as further described herein. The controller 205 is configured to monitor an adapter source current being provided by the AC/DC adapter 203, such as the current through the current terminals of AFET and SFET, which may be sensed as a signal IADP. A voltage VADP represents the adapter voltage VADPIN. When the battery 217 is charging, PMON=VADP·IADP−VBAT·ICHG, which is the adapter power minus battery charging power. When the battery 217 is discharging, PMON=VADP·IADP+VBAT·IDIS which is the adapter power plus the battery discharging power. In this manner, PMON generally indicates the total power level provided via VSYS.

When the AC/DC adapter 203 and the battery 217 are both absent or disconnected, then there is no power source and power is shut down. When the AC/DC adapter 203 is present and the battery 217 is absent or disconnected as indicated by BATOK, then the controller 205 turns BFET off and operates Q1 and Q2 as a buck converter for converting the voltage VIN to the system voltage VSYS. Although not shown in FIG. 2, the controller 205 monitors the voltage level of VSYS, which operates between a minimum voltage level VSYS_MIN and a maximum voltage level VSYS_MAX. The controller 205 turns Q1 on and turns Q2 off to couple the output inductor LO to VIN until an operating parameter is achieved (e.g., voltage, current, power level, time), and then the controller 205 turns Q1 off and Q2 on for a remainder of a pulse width modulation (PWM) cycle to regulate the system output. The system output may be regulated based on voltage, current, power, or any suitable combination thereof.

When both the AC/DC adapter 203 and the battery 217 are present, then the operating condition depends upon the voltage level of VBAT. When VBAT<VSYS_MIN indicating a deeply discharged battery having a voltage level below the minimum voltage level allowed for VSYS, then the controller 205 drives BFET to operate in a linear region. In this case, BFET is operated to act as a non-ideal switch to provide the difference between VSYS_MIN and VBAT. While doing so, charging current through BFET charges the battery 217 to increase its voltage level. When VSYS_MIN≤VBAT<VSYS_MAX such that VBAT is between the minimum and maximum voltage levels, the controller 205 drives BFET to operate in an on or off mode acting as an ideal switch to charge the battery 217. When VBAT reaches or exceeds VSYS_MAX, then the controller 205 turns BFET off to stop charging since the battery 217 is considered fully charged.

When the battery 217 is present but the AC/DC adapter 203 is not, then when VBAT≥VSYS_MIN, then the controller 205 turns BFET on so that the battery 217 discharges to provide power to the system. When VBAT<VSYS_MIN, then the controller 205 turns BFET off to stop providing power from the battery 217. The system power is effectively shut down since there is no source of power.

Figure 3:
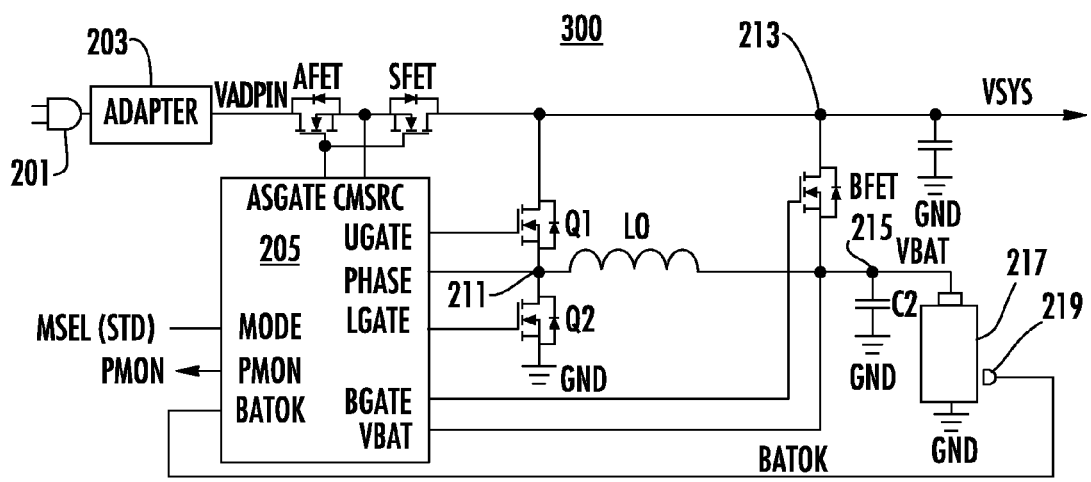
FIG. 3 is a simplified schematic diagram of a battery charge system configured as a standard charger which may be used as the battery charge system of FIG. 1.

FIG. 3 is a simplified schematic diagram of a battery charge system 300 configured as a standard charger which may be used as the battery charge system 103. The battery charge system 300 is similar to the battery charge system 200 in which similar components assume identical reference numerals. In one embodiment, the components are the same but coupled into a standard operating configuration rather than the NVDC operating configuration. In this case, the couplings are substantially similar, except that the drain of SFET is coupled to the drain of Q1 and directly to the system node 213 (eliminating separate input node 209). The system node 213 is not coupled to the output inductor LO, but instead the battery node 215 is coupled to the output end of the output inductor LO. BFET has its source coupled to the battery node 215 and its drain coupled to VSYS. The MSEL value at the MODE terminal of the controller 205 indicates the standard (STD) configuration and operating mode (rather than the NVDC configuration and operating mode). PMON operates in substantially the same manner to develop the PMON voltage at a level indicative of overall system power.

When the AC/DC adapter 203 is present, VADPIN provides the system voltage VSYS via AFET and SFET (both turned on) and the controller 205 turns BFET off. The controller 205 operates Q1 and Q2 in buck mode to charge the battery 217 as necessary until fully charged. In the standard configuration, the controller 205 may also operate the circuitry in a boost mode to boost VBAT to the voltage level of VSYS, in which case the AC/DC adapter 203 and the battery 219 operate together to provide power to the system when the load is heavy. Sudden removal of the battery during the boost mode, however, may cause a system crash due to insufficient power. The battery sensor 219 provides the BATOK signal to indicate whether the battery 219 is inserted. There are two voltage references including VSYS_MAX and VSYS_MIN for the output voltage regulation reference. When the battery is installed and the charger is in output voltage regulation mode, the VSYS_MAX reference is used. When the battery is removed, the controller 205 switches operation to buck mode for regulating the output voltage, and the output voltage regulation reference is switched to VSYS_MIN to prevent overshoot of the adapter current.

When the AC/DC adapter 203 is absent, the controller 205 drives BFET to remain on so that the battery 217 provides the system voltage VSYS. If and when VBAT falls below a predetermined minimum voltage level, such as VSYS_MIN, then the battery 217 is unable to provide sufficient power and the system may be shut down (similar to both AC/DC adapter 203 and battery 217 not being present).

Figure 4:
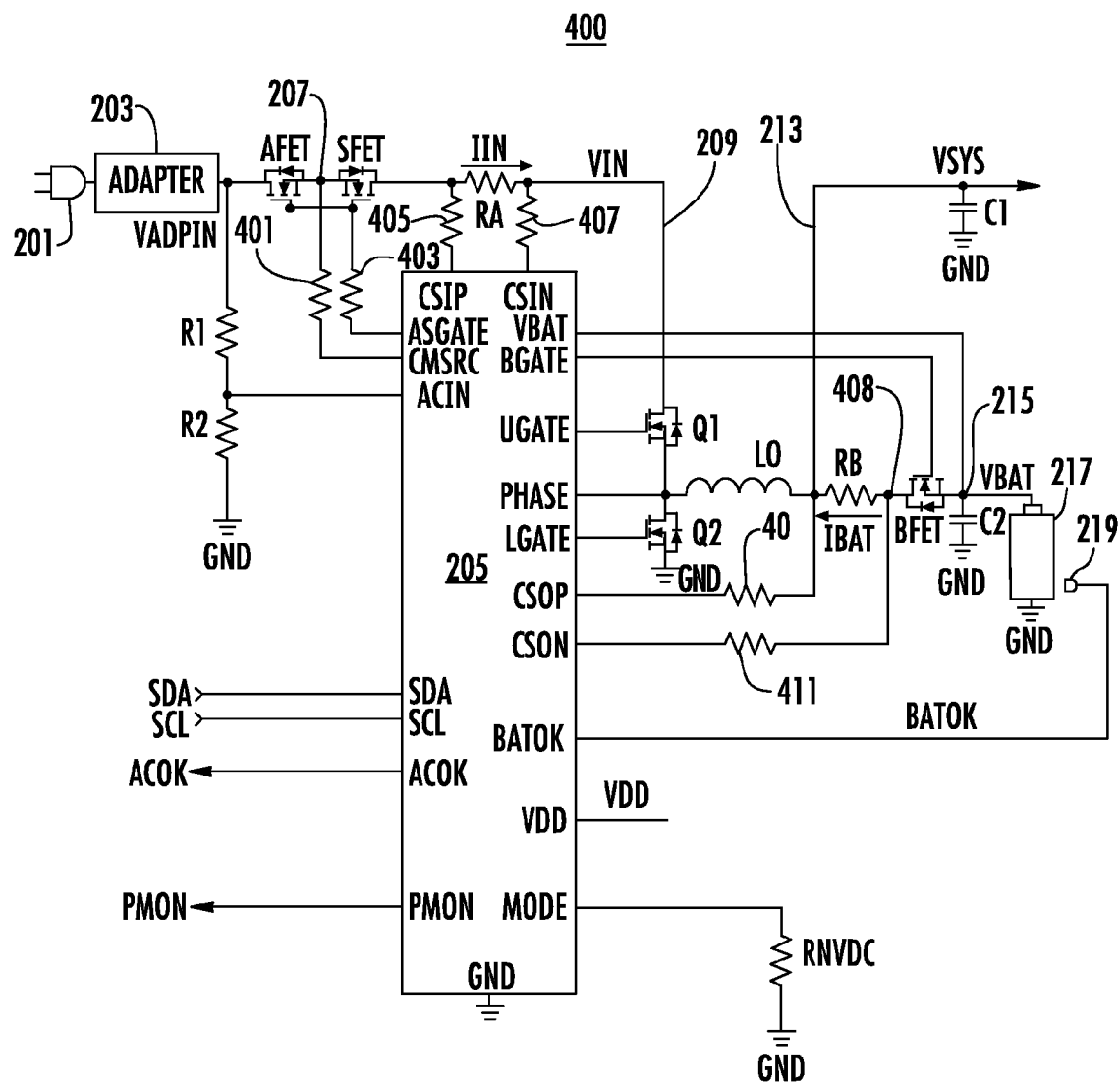
FIG. 4 is a schematic diagram of the battery charge system similar to the battery charge system of FIG. 2 configured as an NVDC charger which may be used as the battery charge system of FIG. 1.

FIG. 4 is a schematic diagram of the battery charge system 400 similar to the battery charge system 200 configured as an NVDC charger which may be used as the battery charge system 103. A more detailed configuration of the controller 205 is shown, although many specific details and extraneous components (e.g., resistors, capacitors, etc.) are omitted as not necessary for a full and complete understanding of the present invention. The AC source 201, AC/DC adapter 203, AFET, SFET, Q1, Q2, LO, BFET, the battery 217 and capacitors C1 and C2 are provided and coupled to the controller 205 in substantially similar manner as the battery charge system 200 configured as an NVDC charger previously described.

In this case, a resistor RNVDC is coupled between the MODE terminal of the controller 205 and GND in which the resistance of RNVDC indicates the NVDC charger configuration. The output voltage VADPIN of the AC/DC adapter 203 is divided down by resistor divider (resistors R1 and R2 coupled in series between VADPIN and GND) having an intermediate node coupled to an ACIN terminal of the controller 205. A limit resistor 401 is coupled between terminal CMSRC and the common node 207 between AFET and SFET and another limit resistor 403 is coupled between the ASGATE terminal and the commonly-coupled gates of AFET and SFET. A sense resistor RA is coupled between the drain of SFET and node 209 and the controller 205 includes terminals CSIP and CSIN coupled on either side of the resistor RA via limit resistors 405 and 407 for sensing an input adapter current shown as IIN.

A sense resistor RB is coupled between the output inductor LO at system node 213 and the drain of BFET at a node 408 for sensing battery current IBAT of the battery 217. The controller 205 includes a terminal CSOP coupled via limit resistor 409 to node 213 and another terminal CSON coupled via limit resistor 411 to node 408 for sensing the voltage across, and thus the current through, the battery current sense resistor RB. The battery current IBAT is shown in a discharge current direction which is in the reverse direction when the battery 217 is being charged. Node 215 developing the battery voltage VBAT is further coupled to a VBAT terminal of the controller 205.

Signals SDA and SCL are provided to corresponding SDA and SCL terminals, respectively, of the controller 205 for externally programming operating parameters of the controller 205. In one embodiment, SDA and SCL are part of a system management bus (SMbus) for programming the controller 205 as understood by those of ordinary skill in the art. The ACIN terminal senses the presence of the AC/DC adapter 203 via VADPIN and asserts a signal ACOK at a corresponding ACOK output terminal indicating the detected presence of the AC/DC adapter 203. The controller 205 may be configured as an integrated circuit (IC) or the like receiving power via supply voltages VDD and GND coupled via corresponding supply pins. Additional circuitry details are not further described.

Figure 5:
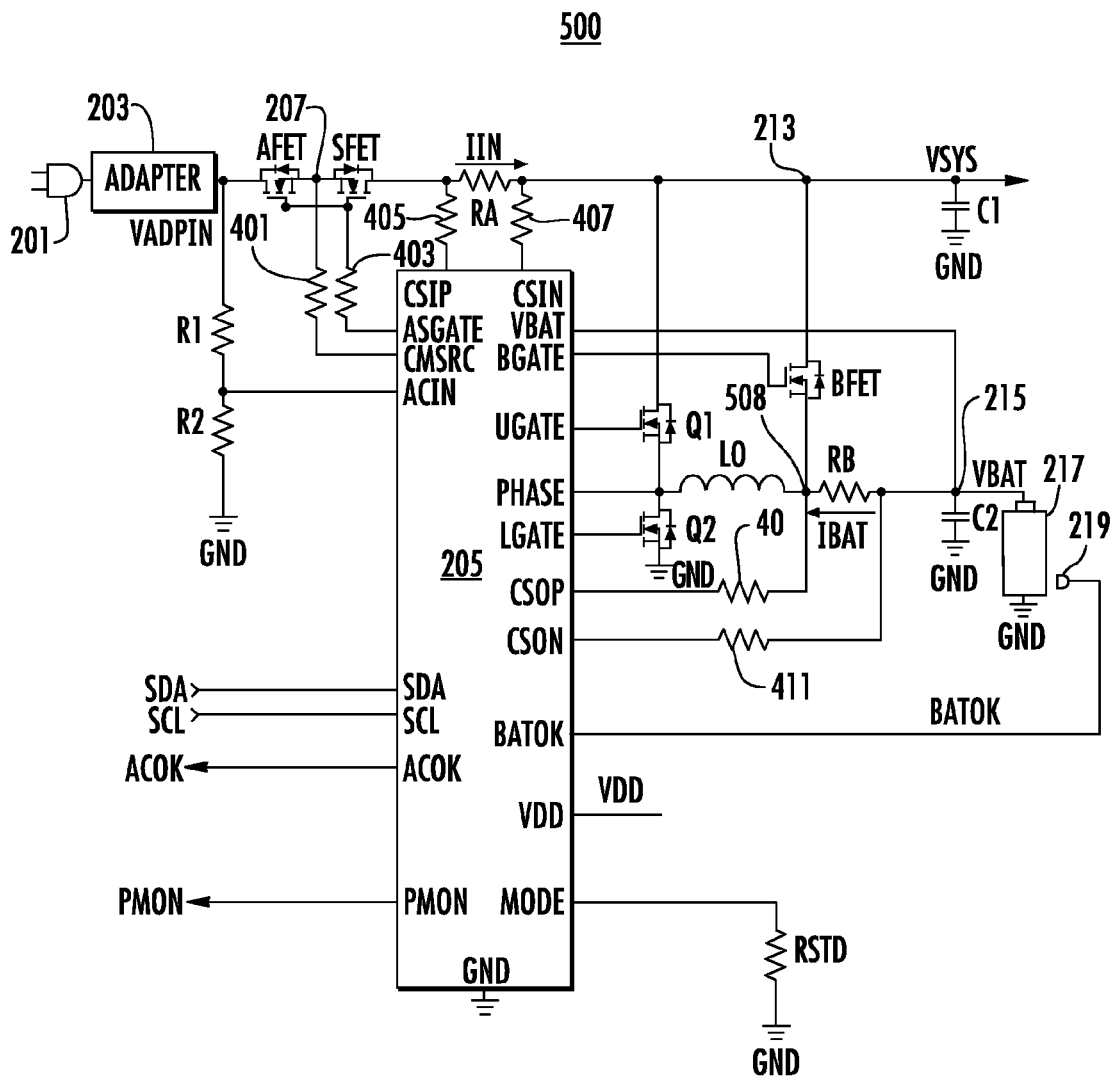
FIG. 5 is a schematic diagram of the battery charge system 500 similar to the battery charge system of FIG. 3 configured as a standard charger which may be used as the battery charge system of FIG. 1.

FIG. 5 is a schematic diagram of the battery charge system 500 similar to the battery charge system 300 configured as a standard charger which may be used as the battery charge system 103. A more detailed configuration of the controller 205 is shown in a similar manner as the battery charge system 400 although many specific details and extraneous components (e.g., resistors, capacitors, etc.) are omitted as not necessary for a full and complete understanding of the present invention. The battery charge system 500 is similar to the battery charge system 400 in which similar components assume identical reference numerals.

In one embodiment, the components are the same but coupled into a standard operating configuration rather than the NVDC operating configuration. The coupling of the components are the same except as further described. In this case, a resistor RSTD is coupled between the MODE terminal of the controller 205 and GND in which the resistance of RSTD indicates the standard charger configuration. Node 209 is omitted and instead the junction between resistors RA and 407 is coupled to the system node 213 developing VSYS. Node 213 is coupled to the drain terminals of Q1 and BFET. The source terminal of BFET is coupled to a node 508 which is also coupled to the output end of the output inductor LO, to one end of the resistor 409, and to one end of the battery current sense resistor RB. The other end of RB is coupled to one end of resistor 411 at the battery node 215 developing VBAT.

Figure 6:
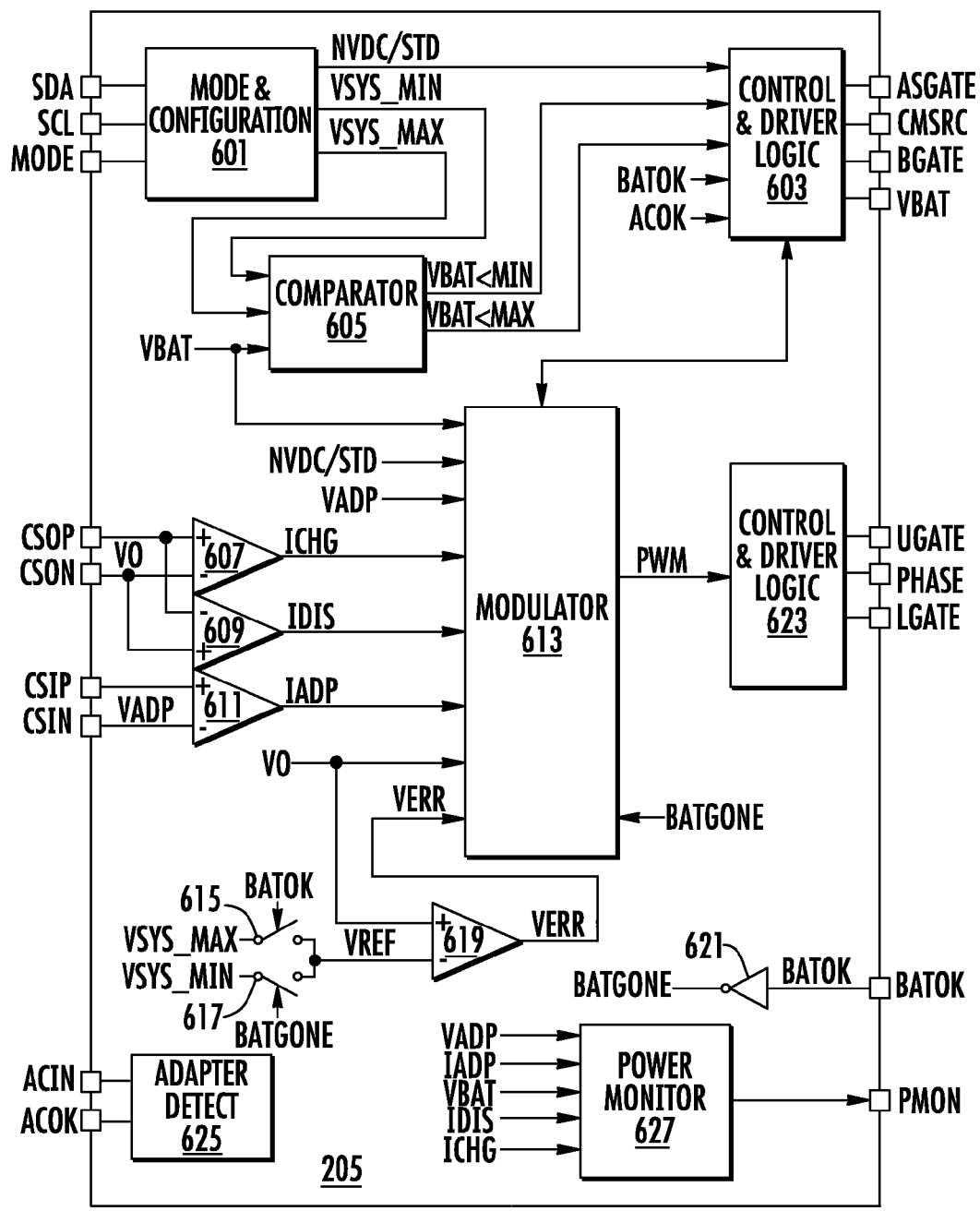
FIG. 6 is a more detailed schematic and block diagram of the controller of FIG. 2 according to one embodiment of the present invention.

FIG. 6 is a more detailed schematic and block diagram of the controller 205 according to one embodiment of the present invention. Certain details of the controller 205 are omitted for clarity as not necessary for a full and complete understanding of the present invention. The controller 205 may be implemented as an IC or chip in which the terminals may be referred to as pins of the IC. A mode and configuration block 601 is coupled to the SDA, SCL and MODE pins. The mode and configuration block 601 monitors the MODE pin and provides a mode signal NVDC/STD which indicates either the NVDC or the STD charger mode and configuration. In one embodiment, the mode signal NVDC/STD may be implemented as a single bit having two states indicating either battery charging operating mode, or may be implemented as separate signals. The mode and configuration block 601 is externally programmed (e.g., via the SMbus including the SDA and SCL signals) and provides a signal VSYS_MIN indicative of the VSYS_MIN voltage level and provides a signal VSYS_MAX indicative of the VSYS_MAX voltage level.

In one embodiment, the SMbus may be used to set the operating mode between standard and NVDC or may be used to override the mode setting determined using the MODE pin.

The NVDC/STD signal is provided to a control and driver logic block 603, which also receives the BATOK signal indicative of the presence of the battery 217 and the signal ACOK indicative of the presence of the AC/DC adapter 203. The control and driver logic block 603 is coupled to the ASGATE, CMSRC, BGATE and VBAT pins for controlling AFET, SFET and BFET.

VSYS_MIN and VSYS_MAX are provided to a comparator block 605 which is also coupled to the VBAT pin for receiving the battery voltage VBAT. In one embodiment, the comparator block 605 provides a first signal VBAT<MIN which indicates whether VBAT is less than VSYS_MIN. In one embodiment, for example, VBAT<MIN is asserted high when VBAT is less than VSYS_MIN and is otherwise asserted low. Also, the comparator block 605 provides a second signal VBAT<MAX which indicates whether VBAT is less than VSYS_MAX. In one embodiment, for example, VBAT<MAX is asserted high when VBAT is less than VSYS_MAX and is otherwise asserted low. VBAT<MIN and VBAT<MAX are provided to respective inputs of the control and driver logic block 603.

It is noted that the VBAT and the VSYS_MAX and VSYS_MIN voltages used within the controller IC may have the same magnitude as the external voltages of VBAT and VSYS, respectively. Alternatively, the internal signals may be amplified (or otherwise reduced) to proportionate voltage levels indicative of the external voltage levels.

The control and driver logic block 603 detects the presence of the AC/DC adapter 203 via the ACOK signal. When the AC/DC adapter 203 is present, the control and driver logic block 603 may assert ASGATE to turn on AFET and SFET to provide adapter power to the system. Otherwise, the control and driver logic block 603 may negate ASGATE to turn off AFET and SFET for isolation as previously described.

When the NVDC/STD signal indicates the standard mode, if the AC/DC adapter 203 is present, then the control and driver logic block 603 may turn BFET off so that the AC/DC adapter 203 may provide power to VSYS. The controller 205 may operate Q1, Q2 and LO to charge the battery 217 if necessary. If the battery 217 is present as indicated by the BATOK signal and if sufficiently charged as indicated by the VBAT<MN signal, then the controller 205 may operate Q1, Q2 and LO in a boost mode to boost the voltage of the battery 217 to VSYS if additional power is desired for the system above that provided by the AC/DC adapter 203. Also, when the AC/DC adapter 203 is not present in the standard mode, and if the battery 217 is present as indicated by the BATOK signal and if sufficiently charged, then the control and driver logic block 603 may turn on BFET to enable the battery 217 to provided power to the system via VSYS.

When the NVDC/STD signal indicates the NVDC mode and the AC/DC adapter 203 is present, then operation of BFET depends upon the charge state of the battery 217. If VBAT<VSYS_MIN (e.g., VBAT<MIN is asserted high) as in the case of a deeply discharged battery, then the control and driver logic block 603 operates BFET in its linear region. In the linear region, BFET is operated to act as a non-ideal switch to provide the difference between VSYS_MIN and VBAT. While doing so, charging current through BFET charges the battery 217 to increase its voltage level. When VSYS_MIN≤VBAT<VSYS_MAX such that VBAT is between the minimum and maximum voltage levels (e.g., VBAT<MIN is asserted low and VBAT<MAX is asserted high), the controller 205 drives BFET to operate in an on or off mode acting as an ideal switch to charge the battery 217. In this case, VSYS may generally have substantially the same voltage as the battery 217 while providing power to the system and while charging the battery 217. When VBAT reaches or exceeds VSYS_MAX (e.g., VBAT<MAX is asserted high), then the control and driver logic block 603 may turn BFET off to stop charging since the battery 217 is considered fully charged.

The CSOP pin is coupled to the positive (non-inverting) input of an amplifier 607 and to the negative (inverting) input of another amplifier 609. The CSON pin develops a voltage VO and is coupled to the negative input of the amplifier 607 and to the positive input of the amplifier 609. The CSIP pin is coupled to the positive input of another amplifier 611 and the CSIN pin is coupled to the negative input of the amplifier 611. CSIN internally develops VADP that represents the adapter voltage VADPIN. The output of the amplifier 607 develops a voltage ICHG indicative of the charging current of the battery 217. The output of the amplifier 609 develops a voltage IDIS indicative of the discharging current of the battery 217. In one embodiment, ICHG and IDIS generally have the same magnitude but opposite polarities in which the polarity of each depends upon whether the battery 217 is charging or discharging. The output of the amplifier 611 develops a voltage IADP indicative of the adapter current, which is externally shown as IIN. ICHG, IDIS and IADP are provided to respective inputs of a modulator 613.

The BATOK pin is coupled to an input of an inverter 621 having an output providing a signal BATGONE. BATOK and BATGONE are thus inverted versions of each other in which BATOK indicates the presence of the battery 217 and BATGONE indicates the absence of the battery 217. VSYS_MAX is provided one input of a switch 615 having a control input receiving BATOK. VSYS_MIN is provided one input of another switch 617 having a control input receiving BATGONE. The other ends of the switches 615 and 617 are coupled together at a node developing a reference voltage VREF, which is provided to a negative input of an error amplifier 619. The VO voltage is provided to the positive input of the error amplifier 619, which provides a VERR voltage at its output indicative of the relative error of the VSYS voltage. VO, VADP, VERR, BATGONE (and/or BATOK), VBAT and the NVDC/STD signals are provided to respective inputs of the modulator 613. The modulator 613 has an output developing a pulse width modulation (PWM) signal provided to an input of a control and driver logic block 623, which is further coupled to the UGATE, PHASE and LGATE pins for controlling Q1 and Q2 based on the PWM signal and other control signals (not shown).

In this manner, when the battery 217 is present, switch 615 is closed and switch 617 is opened so that the modulator 613 regulates VSYS to a maximum level indicated by VSYS_MAX as VREF. When the battery 217 is absent, switch 615 is opened and switch 617 is closed so that the modulator 613 regulates VSYS to a minimum level indicated by VSYS_MIN as VREF. In this manner, VSYS is regulated at a maximum level while the battery 217 is present, and if the battery 217 is suddenly removed, the modulator 613 is switched to operate in buck mode for regulating VSYS, and the output voltage regulation reference is quickly switched to VSYS_MIN to regulate VSYS at the minimum level to prevent overshoot of the adapter current.

The modulator 613 is further coupled to the control and driver logic block 603 to override its normal operating functions under certain operating conditions. For example, in the NVDC mode when additional power is needed above the maximum power level of the AC/DC adapter 203 and the battery 217 is present and sufficiently charged, then BFET may be closed to enable the battery 217 to provide the additional power.

An adapter detect block 625 is coupled to pins ACIN and ACOK. The adapter detect block 625 detects the presence of the AC/DC adapter 213 based on voltage of the ACIN pin, and when the AC/DC adapter 213 is present with a sufficient voltage level, the adapter detect block 625 asserts the ACOK signal on the ACOK pin.

A power monitor block 627 receives the VADP, IADP, VBAT, IDIS and ICHG signals and provides a power monitoring signal PMON on the PMON pin indicating the total power level provided via VSYS. When the battery 217 is charging, PMON=VADP·IADP−VBAT·ICHG, which is the adapter power minus battery charging power. When the battery 217 is discharging, PMON=VADP·IADP+VBAT·IDIS which is the adapter power plus the battery discharging power. The status of battery charging may be determined based on the polarity of either one of the IDIS and ICHG voltages.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A controller that is configurable to operate according to a selected one of a plurality of battery charger configurations, said controller comprising:
a mode terminal and a control terminal;
mode logic, coupled to said mode terminal, that is configured to detect a mode value via said mode terminal wherein said mode value is indicative of one of an NVDC battery charging mode and a standard battery charging mode and that asserts a mode signal indicative thereof; and
control logic, coupled to said control terminal, that is configured to operate according to a selected one of said NVDC battery charging mode and said standard battery charging mode based on said mode signal and that operates a control signal provided to said control terminal indicative of said selected one of said NVDC battery charging mode and said standard battery charging mode.

2. The controller of claim 1, wherein said mode logic is configured to detect a value of an external resistor coupled to said mode terminal indicative of one of said NVDC battery charging mode and said standard battery charging mode.

3. The controller of claim 1, wherein said mode logic is configured to detect a voltage level of said mode terminal indicative of one of said NVDC battery charging mode and said standard battery charging mode.

4. The controller of claim 1, wherein when said standard battery charging mode is indicated by said mode signal, said control logic asserts said control signal in one of on and off states, and wherein when said NVDC battery charging mode is indicated by said mode signal, said control logic asserts said control signal in one of said on and off states or otherwise operates said control signal in a linear mode.

5. The controller of claim 1, further comprising:
adapter detect logic which asserts an adapter present signal indicative of presence of an external power adapter;
comparator logic which asserts a battery level signal indicating whether a battery voltage is at least a predetermined voltage level; and
wherein when said NVDC battery charging mode is indicated, said control logic is configured to:
assert said control signal in a linear mode when said adapter present signal indicates a presence of said external power adapter and when said battery level signal indicates battery voltage is below said predetermined level;
assert said control signal in a selected one of an on state or an off state when said adapter present signal indicates a presence of said external power adapter and when said battery level signal indicates battery voltage is at least said predetermined level; and
assert said control signal in said on state when said adapter present signal indicates absence of said external power adapter and when said battery level signal indicates battery voltage is at least said predetermined level.

6. The controller of claim 5, wherein when said standard battery charging mode is indicated, said control logic is configured to:
assert said control signal in said on state when said adapter present signal indicates absence of said external power adapter and when said battery level signal indicates battery voltage is at least said predetermined level; and
assert said control signal in said off state when said adapter present signal indicates presence of said external power adapter.

7. The controller of claim 1, further comprising:
an error amplifier which asserts an error signal indicative of a relative error of an external system voltage relative to a reference voltage level;
wherein said mode logic further asserts a lower regulator voltage level and an upper regulator voltage level;
a battery detect terminal which provides a battery presence signal indicative of a presence of an external battery; and
a switch circuit which selects said upper regulator voltage level as said reference voltage level when said battery presence signal indicates said presence of an external battery, and which selects said lower regulator voltage level as said reference voltage level when said battery presence signal indicates an absence of said external battery.

8. The controller of claim 1, further comprising:
a battery terminal providing a battery voltage;
an adapter terminal providing an adapter voltage;
a power monitor terminal;
sense circuitry providing an adapter current level and a battery current level; and
power monitor logic that is configured to provide a power monitor signal indicating system power via said power monitor terminal, wherein said power monitor signal comprises said adapter voltage multiplied by said adapter current level plus said battery voltage multiplied by said battery current level when said battery current level indicates battery discharging.

9. The controller of claim 8, wherein said power monitor logic is further configured to provide said power monitor signal comprising said adapter voltage multiplied by said adapter current level minus said battery voltage multiplied by said battery current level when said battery current level indicates battery charging.

10. An electronic device, comprising:
a battery charge system, comprising:
 a converter and battery charger circuit that is configured according to a selected one of an NVDC battery charging configuration and a standard battery charging configuration, wherein said converter and battery charger circuit includes at least one switch control input for controlling switching to regulate a system voltage on an output node and further includes a battery control input;
 a mode select circuit indicative of an NVDC battery charging mode for said NVDC battery charging configuration and a standard battery charging mode for said standard battery charging configuration; and
 a controller having a mode terminal coupled to said mode select circuit and having at least one switch control output coupled to said at least one switch control input of said converter and battery charger circuit, wherein said controller is configured to provide a battery control signal via a battery control terminal to said battery control input to operate said converter and battery charger circuit according to said selected one of said NVDC battery charging mode and said standard battery charging mode.

11. The electronic device of claim 10, further comprising:
a battery node for coupling a battery;
wherein said converter and battery charger circuit comprises:
 at least one power switch and an inductor coupled to said at least one switch control output of said controller and coupled to said output node; and
 a battery switch having current terminals coupled between said output node and said battery node and having a control node coupled to said battery control terminal of said controller; and
wherein said mode select circuit is configured to be indicative of said NVDC battery charging mode for said NVDC battery charging configuration.

12. The electronic device of claim 10, further comprising:
a battery node for coupling a battery;
wherein said converter and battery charger circuit comprises:
 at least one power switch and an inductor coupled to said at least one switch control output of said controller, coupled to said output node, and coupled to said battery node; and
 a battery switch having current terminals coupled between said output node and said battery node and having a control node coupled to said battery control terminal of said controller; and
wherein said mode select circuit is configured to be indicative of said standard battery charging mode for said standard battery charging configuration.

13. The electronic device of claim 10, wherein said mode select circuit comprises a resistor having a resistance indicative of one of said NVDC battery charging mode and said standard battery charging mode.

14. The electronic device of claim 10, further comprising:
a battery sensor providing a battery detect signal indicating whether a battery is present; and
wherein said controller comprises a battery detect terminal receiving said battery detect signal and is further configured to regulate said system voltage at a predetermined maximum voltage level when a battery is indicated as being present and to regulate said system voltage at a predetermined minimum voltage level when a battery is indicated as not being present.

15. The electronic device of claim 10, further comprising:
a battery;
an AC/DC adapter;
wherein said controller comprises at least one input for sensing battery current of said battery, at least one input for sensing battery voltage of said battery, at least one input for sensing adapter current of said AC/DC adapter, and at least one input for sensing adapter voltage of said AC/DC adapter; and
wherein said controller comprises a power monitor terminal providing a power monitor signal, wherein said power monitor signal indicates said adapter voltage multiplied by said adapter current plus said battery voltage multiplied by said battery current when said battery current indicates that said battery is discharging.

16. The electronic device of claim 15, wherein said power monitor signal indicates said adapter voltage multiplied by said adapter current minus said battery voltage multiplied by said battery current when said battery current indicates that said battery is charging.

17. The electronic device of claim 10, further comprising a processor and a memory coupled to said battery charge system.

18. A method of operating a controller that is configured to operate according to a selected one of an NVDC battery charging mode and a standard battery charging mode, comprising:
receiving an adapter indication that indicates presence of an AC/DC adapter;
receiving a battery voltage;
receiving a mode value indicative of one of the NVDC battery charging mode and the standard battery charging mode;

providing a battery switch control signal which operates according to the NVDC battery charging mode or the standard battery charging mode based on the mode value;

wherein when the NVDC battery charging mode is indicated, said providing a battery switch control signal comprises:

operating the battery switch control signal in a linear mode when the AC/DC adapter is present and when the battery voltage is less than a predetermined minimum level;

operating the battery switch control signal in a selected one of an off state and an on state when the AC/DC adapter is present and when the battery voltage is at least the predetermined minimum level; and operating the battery switch control signal in the on state when the AC/DC adapter is absent and when the battery voltage is at least the predetermined minimum level; and wherein when the standard battery charging mode is indicated, said providing a battery switch control signal comprises operating the battery switch control signal in the off state when the when the AC/DC adapter is present and operating the battery switch control signal in the on state when the AC/DC adapter is present and the battery voltage is at least the predetermined minimum level.

19. The method of claim 18, further comprising:

detecting presence of a battery;

when the battery is present, selecting a reference voltage to regulate an external system voltage at a predetermined maximum level; and when the battery is not present, switching the reference voltage to regulate the external system voltage at a predetermined minimum level.

20. The method of claim 18, further comprising:

determining an adapter current and an adapter voltage of the AC/DC adapter;

determining a battery current;

providing a power monitoring signal indicative of the adapter current multiplied by the adapter voltage plus the battery voltage multiplied by the battery current when the battery is discharging; and providing the power monitoring signal indicative of the adapter current multiplied by the adapter voltage minus the battery voltage multiplied by the battery current when the battery is charging.

* * * * *